United States Patent
Yang et al.

(10) Patent No.: US 10,362,585 B2
(45) Date of Patent: Jul. 23, 2019

(54) LICENSED-ASSISTED ACCESS (LAA) USING LONG TERM EVOLUTION (LTE) PROTOCOLS

(71) Applicant: Avago Technologies International Sales Pte. Limited, Singapore (SG)

(72) Inventors: Baoguo Yang, Saratoga, CA (US); Yong Li, San Diego, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 450 days.

(21) Appl. No.: 14/862,977

(22) Filed: Sep. 23, 2015

(65) Prior Publication Data
US 2016/0088642 A1 Mar. 24, 2016

Related U.S. Application Data

(60) Provisional application No. 62/054,814, filed on Sep. 24, 2014.

(51) Int. Cl.
| | |
|---|---|
| *H04W 16/14* | (2009.01) |
| *H04W 72/08* | (2009.01) |
| *H04W 24/08* | (2009.01) |
| *H04W 72/04* | (2009.01) |
| *H04W 24/02* | (2009.01) |

(52) U.S. Cl.
CPC ......... *H04W 72/085* (2013.01); *H04W 16/14* (2013.01); *H04W 24/08* (2013.01); *H04W 72/0446* (2013.01); *H04W 24/02* (2013.01)

(58) Field of Classification Search
CPC ... H04W 72/085; H04W 16/14; H04W 24/08; H04W 72/0446; H04W 24/02; H04W 74/0816; H04W 84/12; H04W 74/08

USPC ................... 455/450–455; 370/329
See application file for complete search history.

(56) References Cited

U.S. PATENT DOCUMENTS

| | | | |
|---|---|---|---|
| 8,792,900 B2 | 7/2014 | Chen et al. | |
| 2014/0287769 A1* | 9/2014 | Taori | H04W 74/0808 455/450 |
| 2015/0043493 A1* | 2/2015 | Gajanan | H04W 72/1215 370/329 |
| 2015/0063099 A1* | 3/2015 | Sadek | H04L 1/20 370/229 |
| 2015/0223075 A1* | 8/2015 | Bashar | H04W 16/14 370/329 |

FOREIGN PATENT DOCUMENTS

| | | |
|---|---|---|
| CN | 101686567 | 3/2010 |
| CN | 103222294 A | 7/2013 |

(Continued)

OTHER PUBLICATIONS

Office Action from CN Application No. 201610074736.2, dated Jun. 5, 2018, 9 pages.

(Continued)

*Primary Examiner* — Marcus Hammonds
(74) *Attorney, Agent, or Firm* — Foley & Lardner LLP; Daniel Rose

(57) ABSTRACT

The disclosure is directed systems and methods for providing robust coexistence for LAA-LTE, including physical layer enhancements and options to support robust coexistence for LAA-LTE, and deployment and evaluation scenarios and methods.

16 Claims, 4 Drawing Sheets

(56) References Cited

FOREIGN PATENT DOCUMENTS

| CN | 103765824 A | 4/2014 |
|---|---|---|
| CN | 103843265 | 6/2014 |
| WO | WO-2013/166472 A2 | 11/2013 |
| WO | WO-2014/148818 | 9/2014 |

OTHER PUBLICATIONS

Office Action from CN Application No. 201510618657.9, dated Jan. 3, 2018, 24 pages (with English translation).

* cited by examiner

LICENSED-ASSISTED ACCESS (LAA) USING LONG TERM EVOLUTION (LTE) PROTOCOLS

RELATED APPLICATIONS

The present application claims the benefit of and priority to U.S. Provisional Patent Application No. 62/054,814, entitled "Systems and Methods for Improved Licensed-Assisted Access (LAA) Using Long Term Evolution (LTE) Protocols," filed Sep. 24, 2014, the entirety of which is incorporated herein by reference.

FIELD OF THE DISCLOSURE

This disclosure generally relates to systems and methods for improved LAA using LTE protocols (LAA-LTE). In particular, this disclosure relates to systems and methods for providing robust coexistence for LAA-LTE, including physical layer enhancements and options to support robust coexistence for LAA-LTE, and deployment and evaluation scenarios and methods.

BACKGROUND OF THE DISCLOSURE

The LTE protocols define wireless data communication standards to allow high speed exchange of data over wireless data networks. A portion of the wireless spectrum has been licensed for use by such data networks. To increase communication speeds, devices may also transmit via a second carrier in an unlicensed portion of the spectrum, using LTE carrier aggregation protocols.

DETAILED DESCRIPTION

Figure 1:
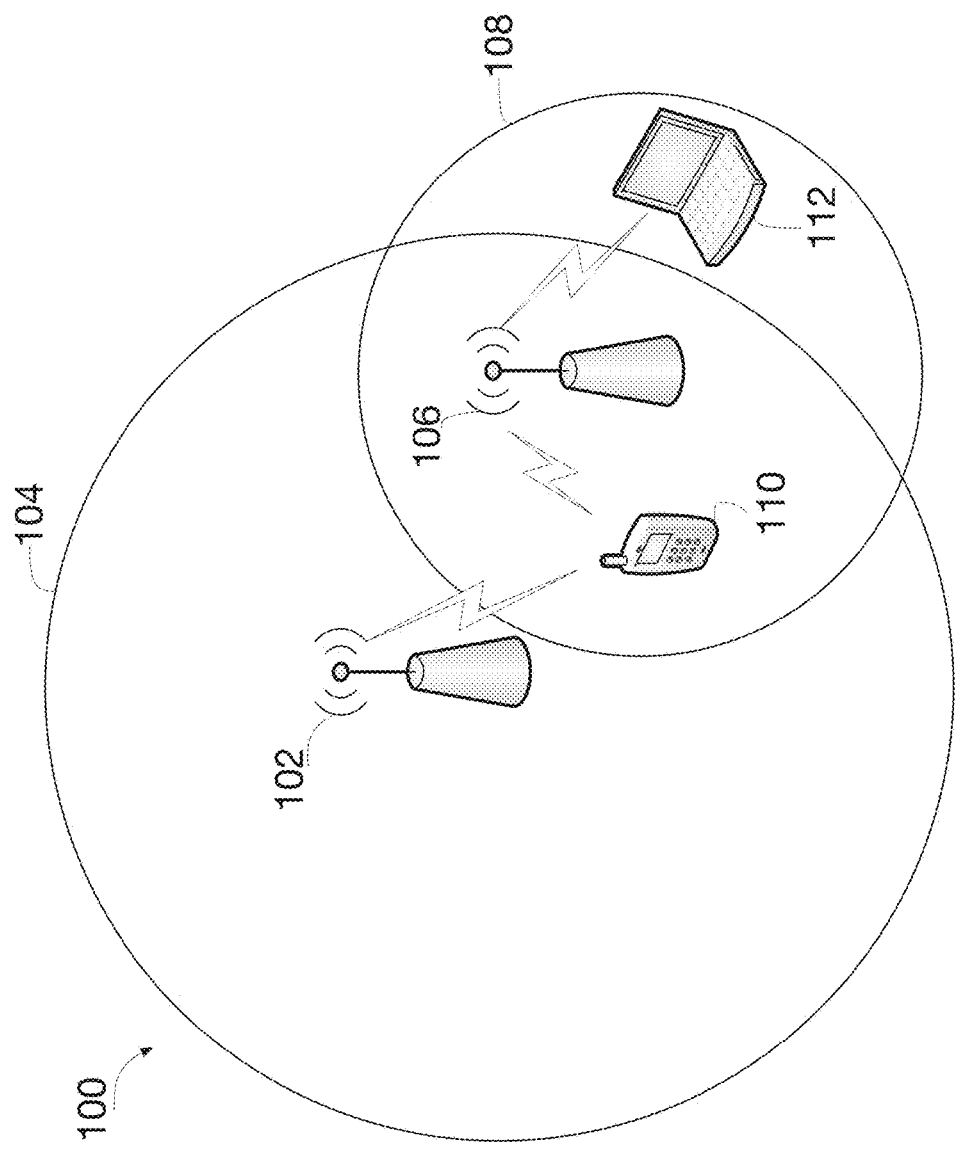
FIG. 1 is a diagram depicting an environment for coexistence of systems within an unlicensed transmission band, according to an embodiment.

For purposes of clarity and convenience, the following description is divided into sections as follows:

Section A describes embodiments of systems and methods for robust coexistence considerations for LAA-LTE;

Section B describes embodiments of systems and methods for physical layer enhancements for LAA-LTE; and Section C describes embodiments of systems and methods for deployment and evaluation of LAA-LTE.

A. Robust-Coexistence Considerations for LAA-LTE

LTE enhancements for a single global solution framework for licensed-assisted access to unlicensed spectrum may involve defined targets for coexistence with other unlicensed spectrum deployments, including fairness with respect to WiFi and other LAA services. This may include relevant fair sharing metrics, e.g., that LAA should not impact WiFi services (data, video and voice services) more than an additional WiFi network on the same carrier; these metrics could include throughput, latency, jitter etc. This may also include in-device coexistence for devices supporting LAA with multiple other-technology radio modems, where it should, e.g., be possible to detect WiFi networks during LAA operation; note that this does not imply concurrent LAA+WiFi reception/transmission. This may also capture co-channel coexistence between different LAA operators and between LAA and other technologies in the same band. LTE enhancements may also include enhancements to the LTE Radio Access Network (RAN) protocols to support deployment in unlicensed spectrum for the scenarios described above The systems and methods described herein are directed to a single global LAA-LTE solution that ensures robust coexistence with incumbent technologies in the targeted unlicensed bands, and in particular, the LAA-LTE design targets and required functionalities for ensuring such robust coexistence. In particular, the embodiments described herein provide clear-channel-assessment (CCA) and channel-reservation procedures that are compatible with WiFi to LAA-LTE.

WiFi is the most prevalent technology currently using unlicensed bands (e.g. 5 GHz). Its use on these bands is still drastically increasing as WiFi is supported by more and more consumer and enterprise devices. This trend will continue into the future, as WiFi-enabled Internet-of-Things starts to be realized in the mass market. Therefore, it may be helpful for any new technology like LAA-LTE introduced into the unlicensed bands to be designed in such a way that it coexists well with WiFi. Otherwise, communications markets may be disrupted and consumers unfairly impacted.

Specifically, in some implementations, the LAA-LTE systems and methods discussed herein:

Ensure robust coexistence with widely-deployed WiFi voice, video and data services, with the impact to these services being benchmarked by basic metrics;

Not incur more packet transmission delay/jitter/loss and throughput impact to an existing WiFi service than a WiFi device that uses the same channel and runs the same applications;

Exhibit an equal level of fairness as WiFi in contention for shared channel access. The fairness may be defined as follows: with multiple devices contenting for channel access, each device shall have the same probability of gaining access to the channel during a pre-specified period of time; and Not prevent a LAA-LTE device from detecting and accessing the WiFi network, if the device supports WiFi.

In order to provide the features stated above, in some implementations, the LAA-LTE transmissions on unlicensed bands follow the established rules that govern the spectrum sharing in these bands. Specifically, in such implementations of these systems and methods, on a unlicensed band:

The LAA-LTE transmissions shall meet government regulations globally for the use of the targeted unlicensed bands. The LAA-LTE shall not target any particular country or region. Rather, the regulations across the globe shall be considered collectively;

The LAA-LTE transmissions shall be organized into transmission "windows" that are compatible with the WiFi transmit opportunities. The size of the transmission window may be variable, but it shall be consistent with the commonly adopted sizes of WiFi transmit opportunities. A transmission window may be occupied by DL only or by both DL and UL in TDD mode;

The LAA-LTE transmissions shall be coordinated by a CCA procedure to ensure the channel availability for transmission, and by a channel-reservation procedure that secures the channel for the duration of the current LAA-LTE transmission window;

The above CCA and channel-reservation procedures shall be consistent with the basic principles laid out in the corresponding WiFi specifications. For example:

The CCA may employ mechanisms such as WiFi preamble decoding, energy detection, WiFi NAV detection, as well as exponential back-off similar to what is required by WiFi.

The channel-reservation procedure shall enable the WiFi nodes sharing the same channel to back-off from the reserved time periods.

Thus, to provide robust coexistence on LAA-LTE, in the systems and methods described herein, LAA-LTE transmissions on an unlicensed band may be coordinated in such a way that it coexists fairly with incumbent technologies, and follows the well-established rules that govern the sharing of unlicensed spectrum. In particular, considering the widespread and drastic-increase in the use of WiFi, the use of channel access by LAA-LTE shall follow rules compatible with the corresponding WiFi requirements for channel access. The CCA and channel-reservation procedures specified in WiFi play a critical role in ensuring fair channel-contention among all participants. As a new entrant to the unlicensed bands, the LAA-LTE systems and methods described herein follow the compatible procedures for fairness and robust coexistence.

B. Physical Layer Enhancements and Options to Support Robust Coexistence for LAA-LTE As discussed above, the CCA or carrier sense is one important function for robust coexistence of LAA in an unlicensed band. A CCA function for LAA, as discussed herein, allows the LAA device to detect if the channel is occupied by another service like WiFi or another LAA operator before it can use the channel to transmit. In some implementations, the CCA function also utilizes a random back-off period after the channel is detected as occupied. There are different options to do CCA including simple energy detection, signal detection of WiFi and LAA, virtual carrier-sense mechanism, or other such options. These different CCA methods may have different impacts on performance of both LAA and WiFi systems in various coexistence scenarios.

Another important function of embodiments of a robust coexistence mechanism of LAA is the channel reservation function. When the LAA device occupies the channel to transmit, the function determines how easily the occupancy can be detected by other devices such as WiFi devices. With the channel reservation function, the LAA device can use the defined procedure to inform its surrounding nearby devices of the occupancy before it starts to transmit. Different options for channel reservation may be utilized in different implementations of these systems and methods. In one implementation, explicit channel reservations may not be utilized in the coexistence mechanism and legacy WiFi devices may use energy detection options to detect the occupancy. In another implementation, a validated channel reservation function compatible with the WiFi system utilizing Network Allocation Vectors (NAV) may be used. Different channel reservation methods may have different impacts on the performance of both LAA and WiFi systems in the coexistence scenarios, and accordingly, implementations may be selected based on efficiency, including efficiency in various scenarios, such as LAA download-only, LAA download and upload, or the coordination of transmissions of multiple LAA cells, etc.

For robust coexistence, in some implementations, LAA devices may need to dynamically share the physical channel with other services like WiFi. The frame timing of WiFi is fully dynamic and undetermined while the frame timing of legacy LTE is fixed. Accordingly, in some implementations, LAA burst start times, burst durations, and frame structures may be varied to utilize the shared channel more efficiently. For example, in one implementation, an LAA device may have a fixed and static subframe timing aligned with the policy and charging control (PCC) requirements of carrier aggregation, and the LAA burst may be aligned with the PCC transmission time interval (TTI) boundary. Such implementations may have the best backward capability. However, it may waste some air time, for example, when the WiFi frees the channel at the middle of an LAA subframe. Other implementations may use dynamic TTI timing, define new frame structures, or use frequency hopping.

In many implementations, LAA transmissions may not be continuous anymore and may be interrupted by a WiFi signal or other services in the unlicensed band. The LTE synchronization signals (SS) and reference signals (RS) such as primary synchronization signals (PSS), secondary synchronization signals (SSS), cell-specific reference signals (CRS), positioning reference signals (PRS), channel state information reference signals (CSI-RS), etc., may become non-continuous too as a consequence. The non-continuous SS and RS will have the potential impacts on the existing procedures defined in the LTE spec such as channel state information (CSI) reporting, cell measurement and detection, etc. There are different options to address the issues. For example, in one implementation, the current LTE frame structure and RS pattern may be reused, but the LAA cell may be required to transmit the approximately periodic minimum RS to assist user equipment to perform CSI reporting, cell measurement, etc. The periodic RS transmission can be interrupted or delayed by other services like WiFi to have a robust coexistence. Other implementations may utilize a new frame structure or RS and SS pattern to address the issues.

In the robust coexistence, LAA transmission in unlicensed band secondary component carriers (SCC) may be opportunistic. In some implementations, hybrid automatic repeat request (HARQ) operations for LAA may be modified. For example, the LAA HARQ may be interrupted by the WiFi signal or other services in the unlicensed band too. In one implementation, HARQ retransmission may be enabled across component carriers (CCs) that are not allowed in standard current CA frameworks. For example, evolved Node B (eNB) hardware can schedule the HARQ retransmission of one LAA transport block over the PCC in the licensed band when the LAA HARQ is interrupted by other services or LAA SCC becomes congested to reduce the HARQ latency and to have the fast recovery and smooth data transfer of LAA.

C. Deployment and Evaluation Considerations for LAA-LTE

To ensure that various implementations of LAA-LTE do not have adverse effects on existing networks, an evaluation methodology for several potential scenarios may be implemented, focusing on LTE CA configurations and architecture where one or more low power secondary cells (Scell(s)), such as those operating at lower power limits in accordance with national regulations, operate in an unlicensed portion of the spectrum and is either download-only or provides both upload and download transmission paths, and where a primary cell (Pcell) operates in a licensed portion of the spectrum utilizing either LTE frequency division duplex (FDD) or LTE time division duplex (TDD) schemes.

Several potential LAA-LTE deployment scenarios are discussed herein, with corresponding evaluation metrics for ensuring LAA-LTE's robust coexistence with WiFi. These scenarios are applicable to all deployment configurations of LAA-LTE (download only, download and upload, CA, co-located/non-co-located, etc.).

In a first deployment scenario involving WiFi Alliance (WFA) WiFi Voice, a 20 MHz channel within the unlicensed national information infrastructure band (e.g. U-NII-3 band) maybe configured with:
- One LAA-LTE Scell (operating in a download-only mode) that supports multiple user equipment (UE) devices, all of which continuously and concurrently download a data file;
- One 802.11n WiFi access point that has ten different 802.11n WiFi clients associated with it. Each of these clients runs an active voice-over-WiFi call with a remote party; and
- One 802.11n WiFi access point that has one 802.11n WiFi client associated with it. The client streams an H.264-coded HD video program from a remote video server.

A second deployment scenario may be identical, except that the channel is 40 MHz. In such a case, the following two configurations should both be considered: 1) two LAA-LTE deployments occupying two non-overlapping 20 MHz channels (one upper and the other lower portion of the 40 MHz channel); 2) one LAA-LTE deployment occupying the entire 40 MHz channel with two 20 MHz component carrier supplemental down links (SDLs).

Both deployment scenarios may, in some implementations, be evaluated by increasing the total number of active UE devices in the Scell in several steps until the aggregate throughput of the UE's reaches a level corresponding to the "fully-loaded" aggregate traffic of the corresponding WiFi clients running the same downloading application. At each step, it may be determined whether each of the following are true for each WiFi client that is running a voice call:
- Packet loss of less than 1%;
- No more than three consecutive lost packets;
- Latency of less than 50 milliseconds; and
- Maximum jitter of less than 50 milliseconds.

In a third deployment scenario involving WiFi video distribution at home, an 80 MHz channel of a U-NII-3 band may be configured with:
- Two LAA-LTE Scells that support one UE each. One Scell runs on the upper 40 MHz of the 80 MHz channel; and the other on the lower 40 MHz. Each of the two UE's runs an H.264-based standard definition video conference session with a remote party if LAA-LTE Scells support download and upload; otherwise (e.g. download only configurations), each UE streams a H.264-based HD program from a remote server.
- One 802.11ac WiFi AP that has five different 802.11ac WiFi clients associated with it. Each of these clients uses the entire 80 MHz channel and streams a H.264-coded HD video program from a remote video server.

A fourth deployment scenario may be identical, except that the channel is 160 MHz and that there are 4 LAA-LTE deployments, each of which runs on a non-overlapping 40 MHz channel that is configured with two 20 MHz component carrier SDLs.

In such implementations, the scenarios may be evaluated by increasing the total number of UE devices in each SCell in several steps, determining at each step whether each WiFi video stream session has the same video quality as a configuration where, instead of using Scells to transport the video conference calls, some 802.11ac WiFi basic service sets (BSSs) on the corresponding channels are used. The video quality measurement can be based on international standards such as ITU-T Rec. J.341, J.246, J.247, etc.

Both sets of scenarios are deemed typical and practical uses of LAA-LTE and WiFi sharing the same channel. The evaluation metrics discussed herein for these two deployment scenarios ensure that the users of these WiFi applications not be negatively and unfairly impacted by LAA-LTE.

Referring now to FIG. 1, a diagram of an environment 100 for coexistence of systems within an unlicensed transmission band is depicted, according to an embodiment. Environment 100 includes at least one first cell 102 and associated first cell network 104, at least one second cell 106 and associated second cell network 108, at least one first device 110, and at least one second device 112. First device 110 is a user device that is capable of accessing first cell network 104 via first cell 102, and accessing second cell network 108 via second cell 106. Second device 112 is a user device that is capable of accessing second cell network 108 via second cell 106.

First cell 102 may comprise a cellular transmitter and receiver, sometimes referred to as a cellular gateway or by any other such name, for providing cellular network connectivity to one or more devices, such as cellular or mobile devices. First cell 102 may be intended to cover a large area, sometimes referred to as a macro cell; intended to cover a smaller area, sometimes referred to as a micro cell; intended to cover a still smaller area, sometimes referred to as a pico cell; or by any other such name. First cell 102 may, in some implementations, provide access to a licensed transmission band of frequencies (sometimes referred to as a licensed band or licensed transmission band), and associated first cell network 104 may be a network in the licensed transmission band. In other implementations, first cell 102 may provide access to an unlicensed transmission band of frequencies (sometimes referred to as an unlicensed band or unlicensed transmission band) and associated network 104 may be in the unlicensed transmission band. In an illustrative example, first cell 102 may a Long Term Evolution (LTE) Evolved Node B (eNodeB), and first cell network 104 may be an LTE network.

Second cell 106 may comprise an access point to connect a group of wireless devices to a local area network (LAN). In some implementations, second cell 106 may comprise a wireless router that integrates a wireless access point, Ethernet switch, and internal router firmware application allowing Ethernet LAN devices to connect to a wide area network (WAN) device. In other implementations, second cell 106 may comprise range-extenders or repeaters which extends the range of an existing network. In some implementations, second cell 106 may provide access to an unlicensed transmission band of frequencies (sometimes referred to as an unlicensed band or unlicensed transmission band) and associated network 108 may be in the unlicensed transmission band. In some implementations, second cell 106 may be an access point that provides access to an unlicensed transmission band, and associate second cell network 108 may be a local area network in the unlicensed transmission band. In an illustrative example, second cell 106 may be a WiFi access point, and second cell network 108 may be a WiFi network on a 2.4 GHz or 5 GHz band.

First device 110 may be a cell phone, tablet, or any other device that is capable of transmitting on a licensed transmission band and on a unlicensed transmission band using fixed frame timing. First device 110 may support frequency division duplexing and time division duplexing, and may switch between using circuit switched and packet switched radio interface. In an illustrative example, first device 110 may be a mobile phone that is capable of transmission on a licensed transmission band via LTE, and on an unlicensed transmission band, such as WiFi.

Second device 112 may be a cell phone, tablet, laptop, or any other device that is capable of transmitting on an unlicensed band utilizing dynamic frame timing. In an illustrative example, second device 110 may be a laptop computer that is capable of transmission via WiFi.

Figure 2:
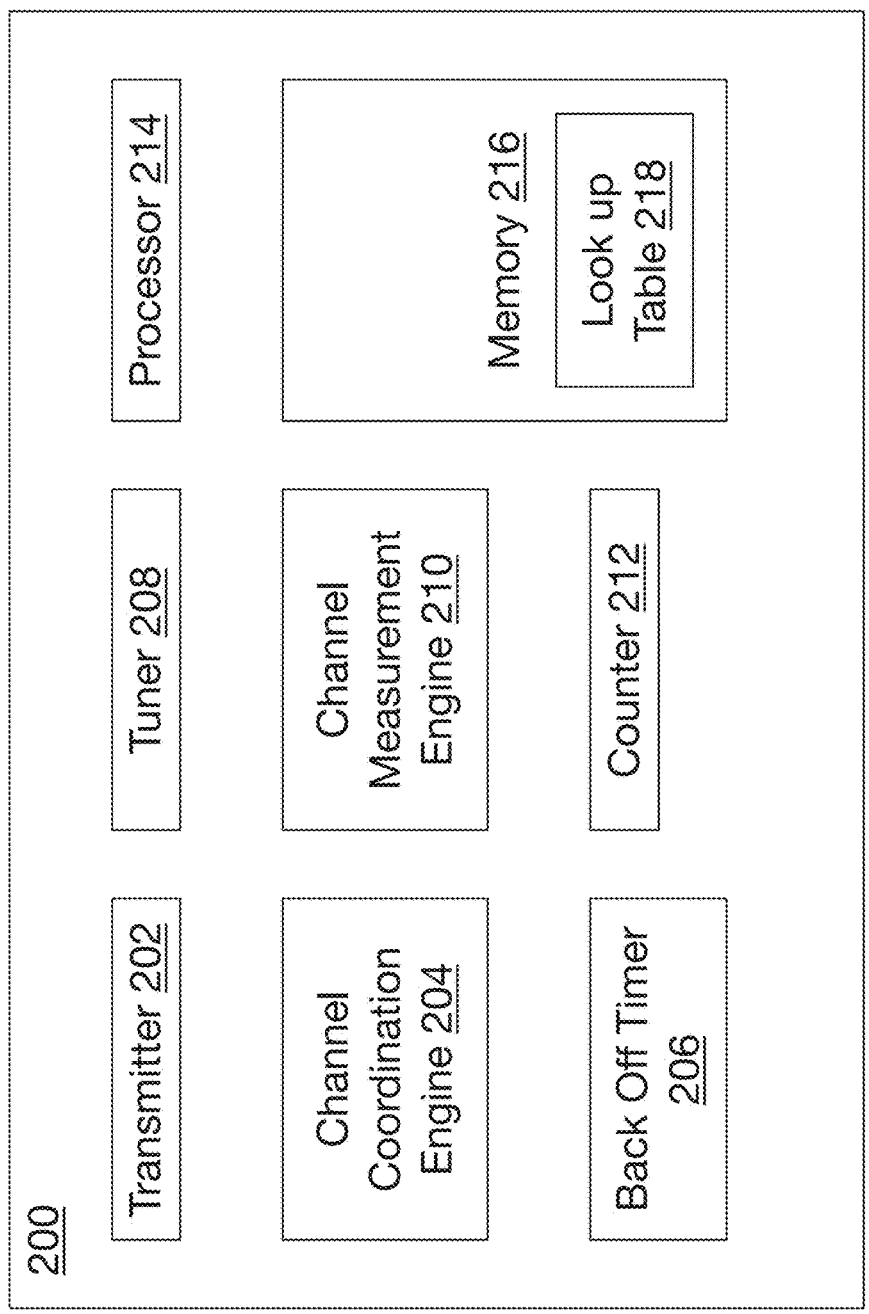
FIG. 2 is a block diagram of a user device for implementing the techniques disclosed herein, according to an embodiment.

Referring now to FIG. 2, a block diagram of a user device 200 capable of transmitting on a unlicensed transmission band utilizing fixed frame timing is depicted, according to various embodiments. User device 200 is an embodiment of a first device 110, and comprises one or more of a transmitter 202, a channel coordination engine 204, a back off timer 206, a tuner 208, a channel measurement engine 210, a counter 212, a processor 214, a memory 216, and a look up table 218. Transmitter 202 sends a transmission after channel coordination engine 204 has determined availability of a channel and reserved the channel. In some implementations, when channel coordination 204 indicates no channels are available, back off timer 216 sets a back off duration. Tuner 208 tunes user device 200 to a frequency, such as a frequency within an unlicensed transmission band. Channel measurement engine 210 measures the impact of a transmission by user device 200 on other transmissions in the unlicensed transmission band (e.g. to determine potential interference with other devices). In some implementations, counter 212 counts the instances of channel unavailability and is used by back off timer 206 to set a back off duration. Look up table 218 may also be used by back off timer 206 to set a back off duration.

In some implementations, transmitter 202 sends transmissions of user device 200 in an unlicensed transmission band. In some implementations, transmitter 202 may be a transceiver capable of sending and receiving transmissions. In other implementations, there may be more than one transmitter 202. In such implementations, multiple transmitters 202 may allow user device 200 to operate on different types of networks, such as WiFi, Bluetooth, and GPS. In one embodiment, transmitter 202 sends a transmission on an unlicensed transmission band using a fixed frame timing transmission window.

Channel coordination engine 204 may comprise hardware, software, or a combination of hardware and software, in various implementations. In some implementations, channel coordination engine 204 is an application, server, service, daemon, routine, or other executable logic for performing determinations of channel availability. When user device 200 wishes to transmit, channel coordination engine 204 determines whether a channel is available for exclusive transmission by user device 200. In one embodiment, channel coordination engine 204 determines the channel availability responsive to an identifier in a preamble of a packet received from second device 112, an energy level of a received transmission from second device 112, or a network allocation vector from second device 112. When channel coordination engine 204 determines that a channel is available, channel coordination engine 204 proceeds with channel reservation. Channel coordination engine 204 indicates the channel reservation to second device 112 using at least one of an indicator in a preamble of a transmitted packet, an energy emission above a predefined threshold, and a network allocation vector.

When a channel is unavailable, channel coordination engine 204 sets a back off duration via the back off timer 206. When a channel is available and user device 200 and second device 112 both wish to transmit, channel coordination engine 204 coordinates the channel reservation by according user device 200 and second device 112 a same probability of gaining access to a channel during a pre-specified period of time. In some implementations, channel coordination engine 204 may also vary a size and a duration of the transmission window, and align the transmission with a transmission time interval boundary. In some implementations, channel coordination engine 204 also detects, while communicating via a first network in a licensed transmission band, a second network in an unlicensed transmission band.

Back off timer 206 is a timer utilized by user device 200 when the channel coordination engine 204 indicates that a channel is not available for transmission. Back off timer 206 may be a timer maintained in memory 216 and periodically decremented or incremented, or may be a hardware timer or other such device. When a channel is not available for transmission, back off timer 206 sets a back off duration, during which time user device 200 waits to check for channel availability. When the back off duration has expired, user device 200 re-determines whether a channel is available for transmission. If a channel is not available for transmission, back off timer 206 sets a new back off duration, and the process repeats.

Back off timer 206 may set a back off duration in any of several ways. In one embodiment, the back off duration may be an exponential back off duration, sometimes referred to as an exponential-random back off duration or exponential-boundary back off duration. When a back off duration is employed, in one implementation, a channel coordination engine 204 may increment a value of counter 212, select a random number from a range between zero and a predetermined boundary based on the value of counter 206, and sets the back off timer 206 to a duration based on the selected number. In an exponential back off implementation, the predetermined boundary based on the value of counter 206 increases at an exponential rate. As an illustrative example, counter 206 may have a value of "n", and the predetermined boundary may be a value of $2^n-1$; for each increment of counter 206, the range from which the duration is chosen increases exponentially. Thus, when a channel is not available for a first instance, counter 212 may have a value of 1, and back off timer 206 would select a number from the range between zero and $2^1-1=1$ (e.g., 0 or 1), and set the back off duration based on that number (e.g. 1 second). When a channel is not available for a second instance, the value of counter 206 is increased to 2, and back off timer 206 would select a number from the range between zero and $2^2-1=3$ (e.g., 0, 1, 2, or 3 seconds). In this manner, subsequent determinations of no channel availability will likely have longer back off durations, resulting in longer periods of time between re-determinations, which reduces determinations of channel availability for a channel in a period of time. In some implementations, the exponential back off range may be limited by an upper boundary (e.g. 5 minutes, 10 minutes, 60 seconds, or any other such value).

In another embodiment, the back off duration may be a random back off duration within a predetermined boundary (e.g. 1-n microseconds). In some embodiments, the boundary may not be adjusted between iterations, while in other embodiments, the back off duration boundary may be increased via any other formula or via a predetermined look up table. Any formula or set of predetermined boundary values may be used. When a back off duration is required, the back off timer 206 increments a value of counter 212, identifies a back off timer range, such as one based on a value selected from the look up table based on the counter value, sets the back off timer to a random duration within the identified back off timer range, and upon expiration of the back off timer, re-detects a channel availability for transmission. For example, in one implementation, the lookup table may associate a back off timer range of up to 10 microseconds with a counter value of 1, up to 20 microseconds with a counter value of 2, up to 30 microseconds with a counter value of 3, 30 to 40 microseconds with a counter value of 4, 30 to 60 microseconds with a counter value of 5, etc., or any other such values The lower, upper, or both boundaries of the range may be different for different counter values. Accordingly, in a random back off implementation, the back off timer range based on the value selected from the look up table does not necessarily increase at an exponential rate. In some embodiments, user device 200 may use both exponential and random back off In other embodiments, user device may use one of exponential or random back off Although described above in contradistinction to "random" back off implementations, in many embodiments as discussed above, the exponential back off methods may still select a random duration within the predetermined range. Furthermore, although discussed above primarily in terms of time (e.g. in microseconds), in some implementations, the back off duration may be a counter value, such as an time slot or idle time slot counter value. For example, a back off duration may be set to 6 idle time slots (such as based on a random selection from a range between 1 and 10 idle time slots). During monitoring, the device may increment a counter for each time slot during which no interference or other signals are detected, counting the time slots during which the channel is idle. In some implementations, the device may skip incrementing the counter if a signal is detected, while in other implementations, the device may reset the counter if a signal is detected.

In embodiments, tuner 208 tunes user device 200 to a frequency range of an unlicensed transmission band. As an illustrative example, tuner 208 may tune user device 200 to the 2.4 GHz band or the 5 GHz band for WiFi use.

In embodiments, channel measurement engine 210 measures an impact of the transmission by user device 200 on other transmissions on the unlicensed transmission band. Channel measurement engine 210 may comprise an application, server, service, daemon, routine, or other executable logic for measuring jitter, latency, throughput, signal strength, bandwidth, noise level, error rates, or any other just environmental or data measurements. In some embodiments, channel measurement engine 210 measure the impact by at least one of throughput, latency, and jitter of the other transmissions on the unlicensed transmission band.

Counter 212 is used by the back up timer 206 to set a back off duration. When the channel coordination engine 204 determines that no channels are available, counter 212 is incremented and back up timer 206 sets a back off duration based on the value of counter 212.

Processor 214 is a central processing unit that responds to and processes instructions fetched from memory 216. Processor 214 may utilize instruction level parallelism, thread level parallelism, different levels of cache, and multi-core processors. A multi-core processor may include two or more processing units on a single computing component. Processor 214 may be any type and form of processor, including any of the processors described below in connection with FIG. 4.

Memory 216 may include one or more memory chips capable of storing data and allowing any storage location to be directly accessed by processor 214. Memory 216 may be volatile or non-volatile. Memory 216 may be any type and form of storage memory, including ROM, RAM, flash memory, a hard drive, or any other type of storage, including any of the type of memory described below in connection with FIG. 4.

In embodiments, look up table 218 is stored in memory 216 and is used by the back up timer 206 to set a back off duration. When the channel coordination engine 204 determines that no channels are available, counter 212 is incremented and back up timer 206 sets a back off duration based on a range selected from the look up table 218.

Figure 3:
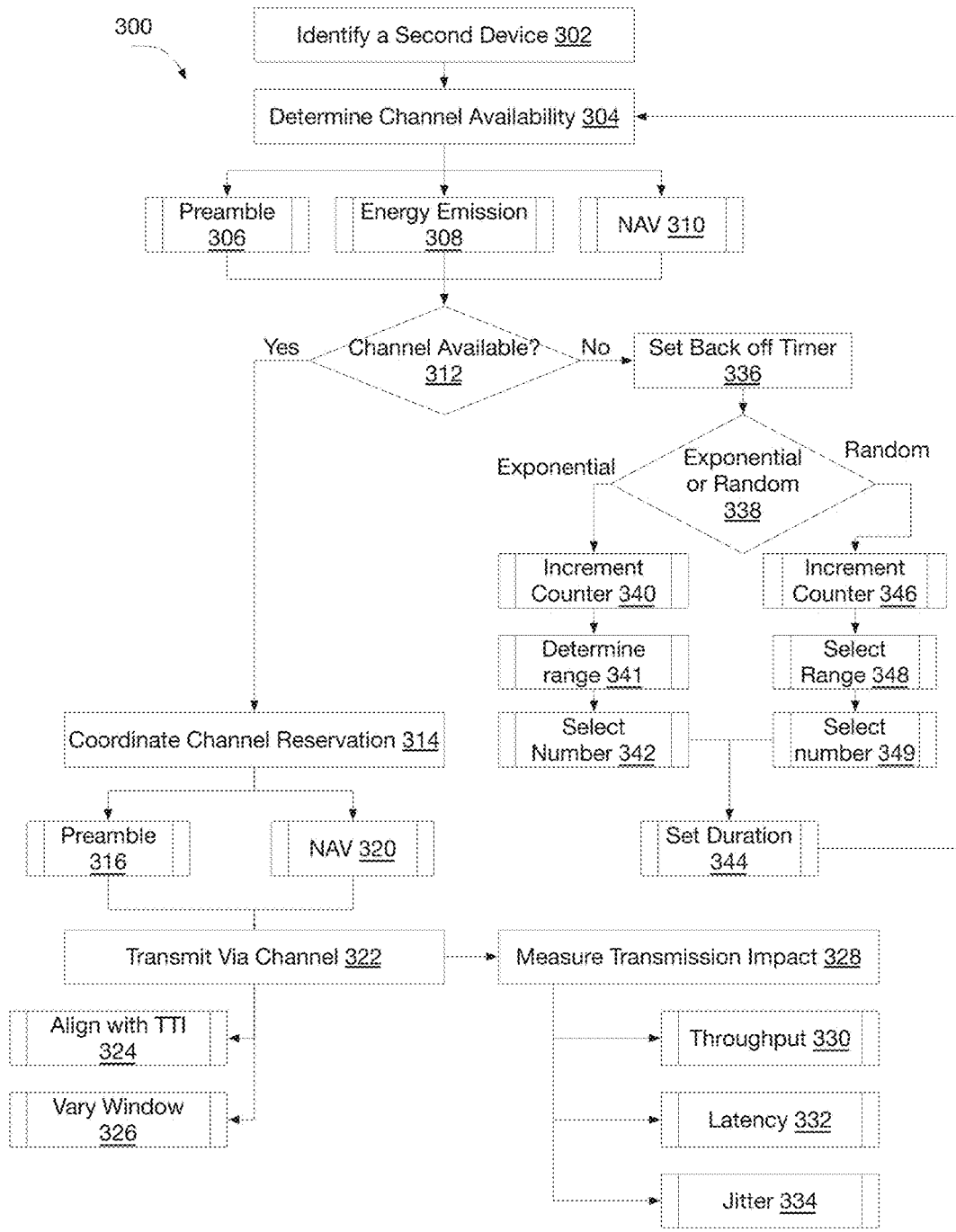
FIG. 3 is a flowchart depicting a method for coexistence of systems within an unlicensed band, according to an embodiment.

Referring now to FIG. 3, a flow chart of a method 300 for coexistence of systems within an unlicensed band is depicted, according to various embodiments. In embodiments, method 300 includes identifying, by a first device, a second device (302), determining, by the first device, channel availability (304), coordinating, by the first device, channel reservation (314), and transmitting, by the first device, a transmission via the reserved channel on the unlicensed transmission band utilizing a fixed frame timing (322).

In some embodiments, determining the channel availability (304) further includes determining, by the first device, the channel availability responsive to an identifier in a preamble of a packet received from the second device (306), an energy level of a received transmission from the second device (308), or a network allocation vector from the second device (310).

In some embodiments, method 300 continues with coordinating, by the first device, channel reservation (314) when a channel is available (312, Yes). In some embodiments, coordinating channel reservation (314) further includes transmitting, by the first device, an channel reservation indicator to the second device, comprising an encoded preamble (316), or a network allocation vector (320).

In some embodiments, method 300 follows with transmitting the transmission via the reserved channel on the unlicensed transmission band utilizing a fixed frame timing (322). In some embodiments, transmitting the transmission further includes organizing, by the first device, the transmission into a transmission window. In some embodiments, transmitting the transmission further includes aligning, by the first device, the transmission with a transmission time interval (TTI) boundary (324). In some embodiments, transmitting the transmission further includes varying, by the first device, a size and a duration of the transmission window (326).

In some embodiments, method 300 includes measuring, by the second device, an impact of the transmission on other transmissions in the unlicensed transmission band (328). In some embodiments, measuring the impact includes measuring, by the second device, throughput (330), latency (332), and jitter (334) of the other transmissions.

In some embodiments, method 300 continues with setting a back off timer (336) when no channels are available (312, No). When the back off duration is an exponential back off duration (338, Exponential), setting the back off duration includes incrementing a counter (340); determining a range with boundaries based on the counter value, said range increasing exponentially with each iteration (341); selecting a random duration or number within the determined range (342); and setting the back off duration to the selected duration or number (e.g. in time, such as microseconds; or in time slots, such as idle time slots) (344). When the back off duration is a non-exponential or random back off duration (338, Random), setting the back off duration includes incrementing the counter (346); identifying a back off timer range (e.g. based on a value selected from a back off look up table based on the counter value, using a fixed range, or any other such non-exponential method) (348); selecting a random duration or number within the identified timer range (349); and setting the back off timer to the selected duration or number (e.g. in time, such as microseconds; or in time slots, such as idle time slots) within the identified back off timer range (344). Upon expiration of the back off timer, method 300 includes re-determining channel availability (304).

Specifically, in some implementations, if no channels are available, the device may wait for a predetermined period of time or a "back off" time, and then repeat the determination of channel availability (304). The device may utilize a random back off period or a back off period randomly selected from within a bounded range. The range boundaries may be predetermined, or may be dynamically adjusted. For example, in some implementations, an upper bound of the range may be increased with each iteration of determination of channel availability. The range may be increased exponentially, in some implementations, referred to as exponential back off; while in other implementations, the range may be increased or adjusted according to a lookup table, which may be referred to as random back off As discussed above, the duration within the range may be selected randomly in both exponential and random back off, and "exponential" may refer to the growth of the range or adjustment of the boundaries. The number of iterations may be maintained by a counter, incremented at step 340. In one implementation, the boundary may be 5 microseconds for a first iteration or counter value; 10 microseconds for a second iteration or counter value; 60 microseconds for a third iteration or counter value, etc. In other such implementations, the device may utilize an exponentially increasing boundary (e.g. 2 microseconds, 4 microseconds, 8 microseconds, 16 microseconds, etc.) for each iteration.

Accordingly, in one aspect, the systems and methods discussed herein provide a method for coexistence of systems within an unlicensed transmission band. The method includes identifying, by a first device configured to transmit on an unlicensed band, a second device configured to transmit on the unlicensed band; and coordinating, by the first device with the second device, a channel reservation to allow exclusive transmission by the first device. The first device utilizes a fixed frame timing, and the second device utilizes a dynamic frame timing.

In some implementations, the method includes coordinating, by the first device with the second device, the channel reservation, the first device and the second device having a same probability of gaining access to a channel during a pre-specified period of time. In a further implementation, the method includes transmitting, by the first device, a channel reservation indicator to the second device, comprising an encoded preamble, an identification of an energy emission above a predefined threshold, or a network allocation vector. In another implementation, the method includes determining, by the first device, a channel availability for the transmission. In a further implementation, the method includes determining the channel availability responsive to an identifier in a preamble of a packet received from the second device, an energy level of a received transmission from the second device, or a network allocation vector from the second device.

In some implementations, the method includes organizing, by the first device, the transmission into a transmission window. In a further implementation, the method includes aligning, by the first device, the transmission with a transmission time interval (TTI) boundary. In another further implementation, the method includes varying, by the first device, a size and a duration of the transmission window. In another implementation, the method includes measuring, by the first device, an impact of the transmission on other transmissions on the unlicensed transmission band. In another further implementation, the method includes measuring throughput, latency, or jitter of the other transmissions.

In another aspect, the present systems and methods describe a device including a transmitter, configured for transmitting on an unlicensed band; and a channel coordination engine. The channel coordination engine is configured to identify a second device transmitting on the unlicensed band and utilizing a dynamic frame timing; determine a channel availability for a transmission by the device; coordinate a channel reservation to allow exclusive transmission by the device; and transmit data via the reserved channel according to a fixed frame timing transmission window.

In some implementations, the channel coordination engine is further configured to determine the channel availability responsive to an identifier in a preamble of a packet received from the second device, an energy level of a received transmission from the second device, or a network allocation vector from the second device. In other implementations, the device includes a back off timer; and the channel coordination engine is further configured to set the back off timer, responsive to a determination that no channels are available for transmission; and upon expiration of the back off timer, re-determine a channel availability for transmission. In a further implementation, the device includes a counter; and the channel coordination engine is further configured to increment the counter, responsive to a determination that no channels are available for the transmission; select a number from a range between zero and a predetermined boundary based on the counter value; and set the back-off timer to a duration based on the selected number.

In some implementations, the channel coordination engine is further configured to indicate the channel reservation to the second device using at least one of an indicator in a preamble of a transmitted packet, an energy emission above a predefined threshold, and a network allocation vector. In another implementation, the channel coordination engine is further configured to vary a size and a duration of the transmission window, and align the transmission with a transmission time interval boundary. In another implementation, the channel coordination engine is further configured to detect, while communicating via a first network in a licensed transmission band, a second network in an unlicensed transmission band.

In still another aspect, the present systems and methods describe a device for calculating a back off interval. The device includes a transmitter configured to transmit on an unlicensed transmission band via a fixed frame timing; a channel availability detector configured to detect a channel availability for a transmission by the device; a back off timer; a counter; and a memory device storing a back off look up table. The device is configured to increment the counter; identify a back off timer range, based on a value selected from the back off look up table based on the counter value; set the back off timer, responsive to a detection that no channels are available for transmission, to a duration within the identified back off timer range; and upon expiration of the back off timer, re-detect a channel availability for transmission.

In some implementations, the device includes a channel measurement engine configured to measure an impact of the transmission by the first device on other transmissions on the unlicensed transmission band. In a further implementation, the channel measurement engine is further configured to measure the impact by at least one of throughput, latency, and jitter of the other transmissions on the unlicensed transmission band.

Figure 4:
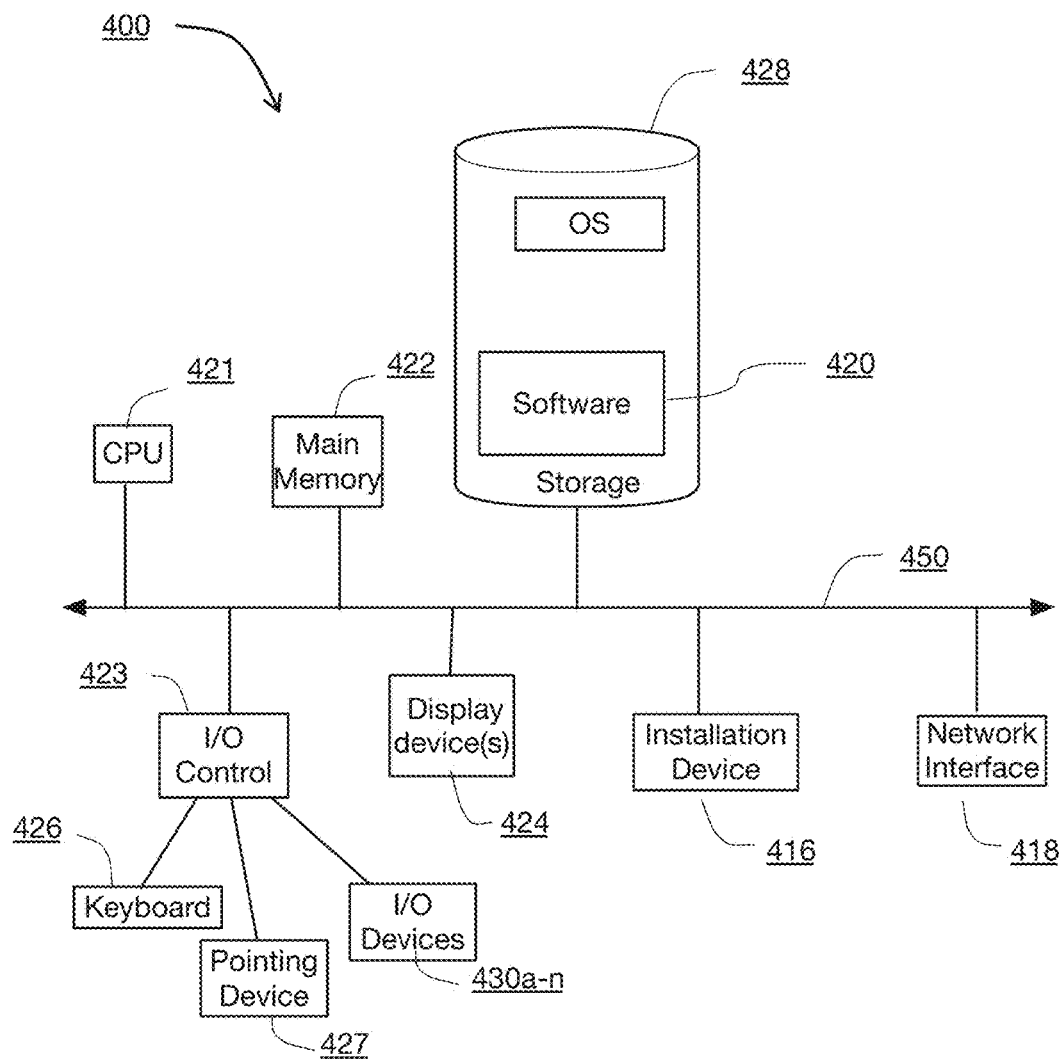
FIG. 4 is a block diagram depicting a computing device, according to an embodiment.

Referring now to FIG. 4, a computing device 400 may include a storage device 428, an installation device 416, a network interface 418, an I/O controller 423, display devices 424a-424n, a keyboard 426 and a pointing device 427, e.g. a mouse. The storage device 428 may include, without limitation, an operating system and software.

The central processing unit 421 is any logic circuitry that responds to and processes instructions fetched from the main memory unit 422. In many embodiments, the central processing unit 421 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 400 may be based on any of these processors, or any other processor capable of operating as described herein. The central processing unit 421 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 422 may include one or more memory chips capable of storing data and allowing any storage location to be directly accessed by the microprocessor 421. Main memory unit 422 may be volatile and faster than storage 428 memory. Main memory units 422 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 422 or the storage 428 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 422 may be based on any of the above described memory chips, or any other available memory chips capable of operating as described herein. Processor 421 communicates with main memory 422 via a system bus 450.

Although the disclosure may reference one or more "users", such "users" can refer to user-associated devices or stations (STAs), for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above may provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for coexistence of systems within an unlicensed transmission band, comprising:
    identifying, by a first device configured to transmit on an unlicensed band, a second device configured to transmit on the unlicensed band and utilizing a dynamic frame timing having a first duration transmission window;
    coordinating, by the first device with the second device, a channel reservation to allow exclusive transmission by the first device; and
    transmitting data, by the first device via the reserved channel, according to a fixed frame timing having a second duration transmission window.

2. The method of claim 1, wherein coordinating the channel reservation further comprises:
    coordinating, by the first device with the second device, the channel reservation, the first device and the second device having a same probability of gaining access to a channel during a pre-specified period of time.

3. The method of claim 2, further comprising:
    transmitting, by the first device, an channel reservation indicator to the second device, comprising an encoded preamble, or a network allocation vector.

4. The method of claim 1, further comprising:
determining, by the first device, a channel availability for the transmission.

5. The method of claim 4, wherein determining the channel availability further comprises
determining the channel availability responsive to an identifier in a preamble of a packet received from the second device, or a network allocation vector from the second device.

6. The method of claim 1, further comprising:
aligning, by the first device, the transmission with a transmission time interval (TTI) boundary.

7. The method of claim 1, further comprising:
varying, by the first device, a size and a duration of the transmission window.

8. The method of claim 1, further comprising:
measuring, by the first device, an impact of the transmission on other transmissions on the unlicensed transmission band.

9. The method of claim 8, wherein measuring the impact of the transmission on other transmissions further comprises measuring throughput, latency, or jitter of the other transmissions.

10. A device, comprising:
a transmitter, configured for transmitting on an unlicensed band; and
a channel coordination engine configured to:
identify a second device transmitting on the unlicensed band and utilizing a dynamic frame timing having a first duration transmission window,
determine a channel availability for a transmission by the device,
coordinate a channel reservation to allow exclusive transmission by the device, and
transmit data via the reserved channel according to a fixed frame timing having a second duration transmission window;
wherein the first duration is dynamically varied by the second device, and the second duration is a static predetermined duration.

11. The device of claim 10, wherein the channel coordination engine is further configured to
determine the channel availability responsive to an identifier in a preamble of a packet received from the second device, or a network allocation vector from the second device.

12. The device of claim 10, wherein the channel coordination engine is further configured to:
indicate the channel reservation to the second device using at least one of an indicator in a preamble of a transmitted packet and a network allocation vector.

13. The device of claim 10, wherein the channel coordination engine is further configured to:
vary a size and a duration of the transmission window, and
align the transmission with a transmission time interval boundary.

14. The device of claim 10, wherein the channel coordination engine is further configured to:
detect, while communicating via a first network in a licensed transmission band, a second network in an unlicensed transmission band.

15. A device, comprising:
a transmitter, configured for transmitting on an unlicensed band;
a back off timer; and
a channel coordination engine configured to:
identify a second device transmitting on the unlicensed band and utilizing a dynamic frame timing having a first duration transmission window,
determine that no channels are available for transmission,
set the back off timer, responsive to the determination that no channels are available for transmission,
upon expiration of the back off timer, re-determine a channel availability for transmission,
coordinate a channel reservation to allow exclusive transmission by the device, and
transmit data via the reserved channel according to a fixed frame timing having a second duration transmission window.

16. The device of claim 15, further comprising a counter; and
wherein the channel coordination engine is further configured to:
increment the counter, responsive to a determination that no channels are available for the transmission,
select a number from a range between zero and a predetermined boundary based on the counter value; and
set the back-off timer to a duration based on the selected number.

* * * * *